United States Patent
Yang et al.

(10) Patent No.: US 11,727,719 B2
(45) Date of Patent: Aug. 15, 2023

(54) SYSTEM AND METHOD FOR DETECTING HUMAN PRESENCE BASED ON DEPTH SENSING AND INERTIAL MEASUREMENT

(71) Applicant: STMICROELECTRONICS, INC., Coppell, TX (US)

(72) Inventors: Xiaoyong Yang, San Jose, CA (US); Kalyan-Kumar Vadlamudi-Reddy, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 197 days.

(21) Appl. No.: 17/006,594

(22) Filed: Aug. 28, 2020

(65) Prior Publication Data

US 2022/0067346 A1    Mar. 3, 2022

(51) Int. Cl.
| | |
|---|---|
| G06V 40/16 | (2022.01) |
| G06F 18/25 | (2023.01) |
| G06F 18/214 | (2023.01) |
| G01B 7/30 | (2006.01) |
| G01C 19/00 | (2013.01) |
| G01S 17/08 | (2006.01) |
| G01S 17/894 | (2020.01) |
| G01B 11/22 | (2006.01) |
| G01P 15/18 | (2013.01) |

(52) U.S. Cl.
CPC ............. *G06V 40/166* (2022.01); *G01B 7/30* (2013.01); *G01B 11/22* (2013.01); *G01C 19/00* (2013.01); *G01P 15/18* (2013.01); *G01S 17/08* (2013.01); *G01S 17/894* (2020.01); *G06F 18/214* (2023.01); *G06F 18/25* (2023.01); *G06V 40/171* (2022.01)

(58) Field of Classification Search
None
See application file for complete search history.

(56) References Cited

U.S. PATENT DOCUMENTS

| | | |
|---|---|---|
| 9,442,564 B1 | 9/2016 | Dillon |
| 9,760,837 B1 | 9/2017 | Nowozin et al. |
| 10,055,013 B2 | 8/2018 | Ramaswamy et al. |
| 10,627,917 B2 | 4/2020 | Hou et al. |
| 11,367,306 B1* | 6/2022 | Kuo ............ G06V 40/166 |
| 2014/0240469 A1 | 8/2014 | Lee |
| 2015/0019163 A1 | 1/2015 | Needham |
| 2015/0066494 A1 | 3/2015 | Salvador et al. |
| 2015/0161434 A1 | 6/2015 | Ross et al. |
| 2018/0053056 A1* | 2/2018 | Rabinovich ........ G06V 40/172 |
| 2018/0288303 A1* | 10/2018 | Wang .................. G01S 17/86 |

(Continued)

OTHER PUBLICATIONS

Ahmad, Zeeshan, and Naimul Khan. "Towards improved human action recognition using convolutional neural networks and multimodal fusion of depth and inertial sensor data." 2018 IEEE International Symposium on Multimedia (ISM). IEEE, 2018. (Year: 2018).*

(Continued)

*Primary Examiner* — Michelle M Entezari
(74) *Attorney, Agent, or Firm* — Seed IP Law Group LLP

(57) ABSTRACT

An electronic device includes a depth sensor and an inertial measurement unit. The electronic device detects a presence of the user of the electronic device by analyzing a combination of inertial sensor signals from the inertial measurement unit and depth sensor signals from the depth sensor.

16 Claims, 5 Drawing Sheets

(56) References Cited

U.S. PATENT DOCUMENTS

| | | | |
|---|---|---|---|
| 2019/0050729 A1* | 2/2019 | Lakshmanan | B60W 30/00 |
| 2019/0079536 A1* | 3/2019 | Zhu | G05D 1/0253 |
| 2019/0213309 A1 | 7/2019 | Morestin et al. | |
| 2020/0086861 A1* | 3/2020 | McGill, Jr. | G05D 1/0257 |
| 2020/0110451 A1* | 4/2020 | He | G06F 1/1684 |
| 2020/0125179 A1 | 4/2020 | Okuley | |
| 2020/0377108 A1* | 12/2020 | Balazs | G06F 18/251 |
| 2021/0304514 A1* | 9/2021 | Croxford | G06V 10/764 |
| 2022/0036577 A1* | 2/2022 | Lopez Mendez | G06T 7/70 |
| 2022/0067525 A1* | 3/2022 | Sequeira | G06N 3/082 |

OTHER PUBLICATIONS

Bartels, "Applications for Time-of-Flight Cameras in Robotics, Logistics and Medicine," White Paper, <<https://www.baslerweb.com/en/sales-support/downloads/document-downloads/tof-cameras-in-logistics-robotics-and-medicine/>> Aug. 2017, pp. 1-7.

Haselton, "Samsung Galaxy S8's facial recognition can be tricked with a photo," Mar. 31, 2017, <<https://www.cnbc.com/2017/03/31/galaxy-s8-facial-recognition-can-be-tricked-with-a-photo.html>> downloaded Jan. 5, 2018, 3 pages.

Microsoft, "Windows Hello face authentication," Nov. 16, 2018 <<https://docs.microsoft.com/en-us/windows-hardware/design/device-experiences/windows-hello-face-authentication>> downloaded Dec. 28, 2018, 4 pages.

Yoshida, "iPhones X's TrueDepth Module Dissected," EE Times, Nov. 17, 2017 <<https://www.eetimes.com/iphone-xs-truedepth-module-dissected/?page_number-1>> downloaded Dec. 28, 2018, 3 pages.

Chen et al., "A Real Time Human Action Recognition System Using Depth and Inertial Sensor Fusion", *IEEE Sensors Journal*, vol. 16(3), Feb. 2016, 10 pages.

* cited by examiner

SYSTEM AND METHOD FOR DETECTING HUMAN PRESENCE BASED ON DEPTH SENSING AND INERTIAL MEASUREMENT

BACKGROUND

Technical Field

The present disclosure is related to detecting the presence of users of electronic devices.

Description of the Related Art

Individuals utilize electronic devices of many kinds. Some electronic devices attempt to recognize the presence of the user using depth sensors positioned near the displays of the electronic devices. This can be useful in unlocking electronic devices automatically and for various other applications. However, it can be very difficult to reliably detect the presence of the user.

BRIEF SUMMARY

The present disclosure is directed to an electronic device that detects the presence of a user based on both a depth sensor and an inertial measurement unit. The depth sensor generates depth sensor signals indicating the distance between the electronic device and objects in the field of view of the depth sensor. The inertial measurement unit generates inertial sensor signals that indicate the motion and orientation of the electronic device. The electronic device analyzes both the depth sensor signals and the inertial sensor signals to reliably detect the presence of the user. This can provide improved reliability over electronic devices that rely on a depth sensor alone to detect the presence of the user.

BRIEF DESCRIPTION OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known algorithms associated with facial recognition, facial detection, and facial authentication have not been shown or described in detail, to avoid unnecessarily obscuring descriptions of the embodiments. Further, well-known structures associated with the time of flight sensor and inertial measurement units have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
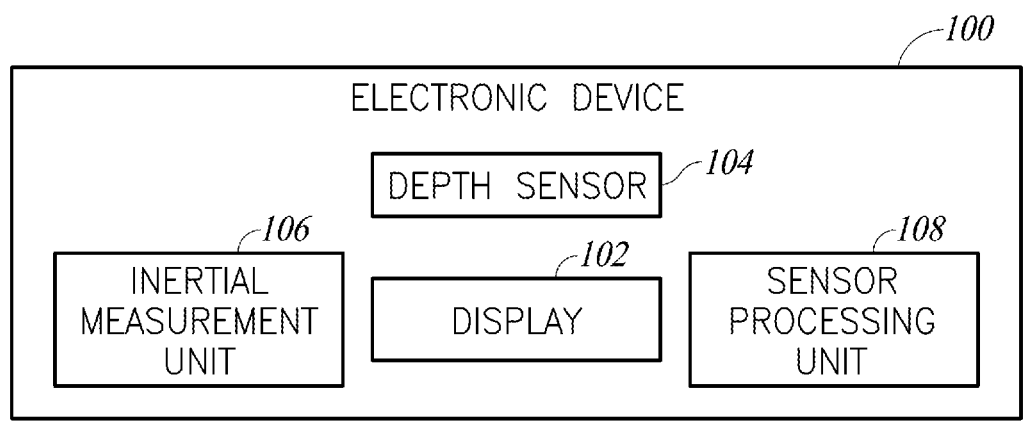
FIG. 1 is a block diagram of an electronic device, according to one embodiment.

FIG. 1 is a block diagram of an electronic device 100, according to one embodiment. The electronic device 100 includes a display 102, a depth sensor 104, an inertial measurement unit 106, and a sensor processing unit 108. As will be described in more detail below, the depth sensor 104, the inertial measurement unit 106, and the sensor processing unit 108 cooperate together to detect the presence of the user of the electronic device 100.

The electronic device 100 includes a display 102. When a user utilizes the electronic device 100, the user typically orients the electronic device such that the user can clearly see the display 102 in order to view text, images, videos, graphical user interfaces (GUIs), or other graphical features that can be displayed on the display 102. Most often, the user will orient the electronic device 102 such that the display 102 is relatively close to the face of the user and such that the eyes of the user look approximately at the center of the screen when the eyes of the user are looking straightforward or slightly downward.

The electronic device 100 takes advantage of the typical positioning of the user's face relative to the display 102 to enable detection of the presence of the user and to recognize the face of the user. Detecting the presence of the user and recognizing the face of the user can be utilized in a variety of ways. For example, the electronic device 100 can utilize user detection and facial recognition to automatically unlock the electronic device, to automatically focus on the face of the user when capturing images of the user, and for a large variety of other reasons. As used herein, detecting the presence of the user can include detecting the face of the user or recognizing the face of the user.

The electronic device 100 utilizes the depth sensor 104 to detect the presence of the user. The depth sensor 104 can include various light sources and light sensors to sense the depth of objects in front of the display 102. As described herein, "depth" refers to the distance between the depth sensor 104 and objects in front of the depth sensor 104. Typically, the user's face is closer to the display 102 than are other objects or structures in the environment of the electronic device 100. Accordingly, sensing the depth of various objects in front of the display 102 can assist in detecting the face of the user.

Traditional user detection schemes are limited to depth sensors. These traditional user detection schemes expect the face of the user to be more or less in the center of the field of view of the depth sensor. If the face of the user is not near the center of the field of view of the depth sensors, then traditional depth sensors will fail to accurately detect and recognize the face of the user. The electronic device 100 overcomes the drawbacks of traditional depth sensing schemes by detecting the user based on signals from both the depth sensor 104 and the inertial measurement unit 106.

The inertial measurement unit 106 includes one or more inertial sensors. The inertial sensors can include one or more accelerometers and one or more gyroscopes. The accelerometers and gyroscopes can detect the orientation, linear motion, and angular motion of the electronic device 100. The inertial measurement unit 106 outputs inertial sensor signals indicative of one or more of linear motion, angular motion, and current orientation of the electronic device 100.

The sensor processing unit 108 receives the depth sensor signals from the depth sensor 104 and the inertial sensor signals from the inertial measurement unit 106. The sensor processing unit 108 analyzes both the depth sensor signals and the inertial sensor signals. The sensor processing unit 108 detects and recognizes the face of the user based on both the depth sensor signals and the inertial sensor signals.

In one embodiment, the depth sensor 104 generates depth sensor signals indicating the depth of objects in front of the display 102 or in the field of view of the depth sensor 104. The inertial measurement unit 106 generates inertial signals indicating an orientation of the display 102 relative to vertical. The sensor processing unit 108 determines, based on the orientation relative to vertical indicated by the inertial signals, that the face of the user is expected to be in the vertical middle of the field of view, in an upper part of the field of view, or in a lower part of the field of view of the depth sensor 104. The sensor processing unit 108 analyzes the depth sensor signals in light of the expected position of the user based on the inertial sensor signals. Based on the inertial sensor signals, the sensor processing unit 108 is able to more reliably find and recognize the face of the user from the depth sensor signals.

In one embodiment, the inertial measurement unit 106 generates inertial signals indicating the lateral rotation of the electronic device 100. The sensor processing unit 108 determines that, based on the lateral rotation indicated by the inertial signals, the face of the user is expected to be in the horizontal middle of the field of view of the depth sensor 104, in a left part of the field of view, or in a right part of the field of view of the depth sensor 104. The sensor processing unit 108 analyzes the depth sensor signals in light of the expected position of the user based on the inertial sensor signals. Based on the inertial sensor signals, the sensor processing unit 108 is able to more reliably find and recognize the face of the user from the depth sensor signals.

In one embodiment, the sensor processing unit 108 includes an analysis model trained with a machine learning process. The machine learning process trains the analysis model to detect and recognize the face of the user based on the inertial sensor signals from the inertial measurement unit 106 and the depth sensor signals from the depth sensor 104. The analysis model can include a neural network. Further details related to an analysis model and a machine learning process are provided in relation to FIG. 4.

The depth sensor 104 may be any suitable sensor capable of measuring distance. For example, the depth sensor 104 may utilize lasers, or any light sources for measuring distance. Other examples may include utilizing sound waves for measuring distance. In some embodiments, the depth sensor 104 includes a time of flight (time of flight) sensor.

Time of flight sensing measures the distance between a sensor and an object placed in a scene, based on the time difference between the emission of a signal (e.g., emitter) and its return to the sensor (e.g., collector), after being reflected by the object in the scene. For example, a photon may be emitted through the emitter, and when the photon hits a target object, it is reflected back, and the collector receives the photon to calculate the distance between the sensor and the target object. One formula that can be used to calculate the distance is as follows:

$$\text{Measured Distance} = (\text{Photon Travel Time})/2 \times \text{Speed of Light}$$

Accordingly, the time of flight sensor is a range imaging camera system that resolves distance based on the known speed of light, measuring the time of flight of a light signal between the sensor/camera and the subject for each point of the image. The terms sensor or camera, as used herein, may be used interchangeably. The time of flight sensors generally provide substantial sensing range, fast readings, and high accuracy while still maintaining small size, low weight and low power consumption characteristics. In addition, the time of flight sensors are not affected by light, so measuring distance in dark settings is also possible.

In one embodiment, the depth sensor 104 has at least two modes, a first mode of operation and a second mode of operation. For example, the depth sensor 104 may have a first mode that operates at a relatively lower power mode than a second mode. Under the first mode of the depth sensor 104, the depth sensor 104 detects a single point in a scene that is within a selected distance. Under the second mode of the depth sensor 104, the depth sensor 104 detects multiple points in the scene that are within a certain distance. The first mode enables the depth sensor 104 to detect user presence that is proximal to the sensor 104. The second mode enables the depth sensor 104 to detect a face, and to create a depth map of a face for facial recognition use.

Because the depth sensor 104 under the first mode detects distance of a single randomly selected point in a scene, it operates under a relatively low power. However, in order for the depth sensor 104 to detect presence under the first mode, this single point is a point proximal to the sensor. One of the purposes of the first mode is to detect presence of a user proximal to the sensor, and in response to that detection, activate the second mode for detecting and generating face information (e.g., depth map of a face, distinctive features on the surface of a face, etc.) of the user. Accordingly, detecting presence of a user that is too remote or far away from the electronic device 100 may involve more power consumption, and may not be beneficial in starting the facial recognition process.

In one embodiment, the depth sensor 104 senses a distance that is within a range of a first presence detection threshold and a second presence detection threshold. A user's face may not be able to be detected if the face is too close to the electronic device 100, or the lens of the depth sensor 104. On the other hand, the user's face may not be able to be detected if the face is too far away from the electronic device 100. The depth sensor 104 may not be able to effectively detect the distinctive facial features and create a depth map of that face without excessive power consumption of the device 100. The first presence detection threshold refers to a minimum distance that enables the depth sensor 104 in the device 100 to initiate facial recognition of a user. The second presence detection threshold refers to a maximum distance that enables the depth sensor 104 in the device 100 to perform facial recognition of a user. For example, if the user's face is beyond the second presence detection threshold, the sensor 102 may not be able to effectively build a depth map of the face of the user without involving excessive power consumption, even though the user may be within an angle of view of the depth sensor 104. That is, while the depth sensor 104 may be able to detect presence of the user under the first mode, it will not be able to create the depth map of the user under the second mode because it is beyond the preferred sensing range for facial detection. On the other hand, if the user's face is too close to the depth sensor 104 (e.g., closer than the first presence detection threshold), so as to block the angle of view of the depth sensor 104 partially or entirely, the depth sensor 104 will be incapable of performing the facial recognition process under the second mode, even though a presence of the user may have been detected under the first mode. Therefore, the second mode to start the recognition is only entered if the distance of the face is between the first and second thresholds.

The first mode of depth sensor 104 detects a distance of, for example, a single point in the scene within a certain range. If a user is present, either by waving in front of the device, standing in front of the device, or posing a gesture in front of the device, the sensor 102 will detect a distance change, and determine that a user is present. The liveliness, the motion, and the gesture of users are all detectable under the first mode to indicate user presence.

The second mode of depth sensor 104 detects multiple points in the scene, preferably the user's face, within the range of the first presence detection threshold and the second presence detection threshold (hereinafter referred to as "face recognizable distance") to receive multiple distance measurements. As such, the second mode may operate at a higher power than the first mode. The face recognizable distance refers to a distance in which a face is positioned at a recognizable distance between a first presence detection threshold and a second presence detection threshold. In other embodiments, the face recognizable distance may refer to a range that falls between a first presence detection threshold and a second presence detection threshold, and a face may be recognizable when the face is positioned within this range. In one embodiment, detecting multiple points within the face recognizable distance can be performed by using multiple single-photon avalanche diode (SPAD) arrays in the time of flight sensor. The SPAD arrays of the time of flight sensor may be used to effectively collect distance information from various zones of the face of the user. For example, the SPAD array of the sensor may receive multiple distances from multiple zones of the face, and based on multiple distance measurements, the time of flight sensor 102 may generate the depth map of the face of the user within the face recognizable distance and within the angle of view of the sensor. The depth map of the face created may later be used for face authentication. A processing circuitry in the device 100 will incorporate this face-related information, and will compare the user's face information with those of a pre-stored authorized user's face information.

The depth sensor 104 may include a reflectance sensor that is part of, or operates in conjunction with, a time of flight sensor. The reflectance sensor is operable to sense a reflectance of the object in the scene based on a surface characteristic of the object. For example, the surface characteristic of a person in the scene is different from the surface characteristic of a non-person object in the scene. In one embodiment, the reflectance sensor may determine that a sensed object is not a person if the object has a high reflectance. For example, objects including metal may have a high reflectance compared to the reflectance of a human's skin. Generally, a surface reflectance value of a human being is different from that of other objects such as metal, plastic or the like. The reflectance sensor in conjunction with a processor in the device 100 may have a pre-stored range of the surface reflectance value of a person, and may easily detect whether the reflectance value substantially matches those of a human compared to a non-human object. The reflectance sensor also assists in preventing any attempts of face authentication fraud by using a picture of an authorized user's face for unlocking the device 100. The surface reflectance characteristics of a real human skin and a photo will differ significantly, and the reflectance sensor will stop recognition if there are any attempts at spoofing the sensor. That is, the reflectance sensor will analyze the distances to determine that the detected face is indeed a three-dimensional face, as opposed to a photograph or print of a human face.

In one embodiment, the reflectance sensor may be a stand-alone sensor that detects surface reflectance of an object. However, in some embodiments, the reflectance sensor may be incorporated into the depth sensor 104. For example, a depth sensor 104 according to an embodiment of the present disclosure is a time of flight sensor, and the time of flight sensor is capable of sensing distance as well as surface reflectance of an object. When the time of flight sensor determines distance based on the returned signal, the time of flight sensor can also sense signal amplitudes of the returned signal. The amplitude of a signal of the originally emitted signal may have a different amplitude from the reflected signal when it hits a surface of an object and reflects back to the time of flight sensor. For example, an object having high reflectance, such as metal, will not have reduced or attenuated signal amplitude in the reflected signal, whereas human skin may have substantially reduced signal amplitude in the reflected signal. This change of signal amplitude may be used by processors to identify whether the object is a person or a non-person based on a lookup table including signal amplitude information and surface reflectance information related to human skin. When a reflectance value is within the range of human skin, the processor may determine that the object is human based on the inputs from the reflectance sensor, or the time of flight sensor, or both, depending on the embodiment.

In addition, as mentioned previously, the reflectance sensor is useful when the device 100 is determining between an actual face of an authorized user and a picture of the authorized user. For example, without the reflectance sensor, it is difficult to distinguish between an actual photo printout or a digital display of the authorized user and the actual face of the user. However, with the reflectance sensor, the reflectance characteristics of a paper and a human skin, or the reflectance characteristics of a glass or plastic display (e.g., if a face presented for recognition is shown on a mobile device as stored in a digital picture album, instead of being a live person) will be significantly different, and would protect the user from any spoofing attempts by unauthorized users.

In some embodiments, the depth sensor 104 may be incorporated with the reflectance sensor as one depth sensor 104. This depth sensor 104 may be able to generate a plurality of measurements associated with an object or a user. These measurements may include a distance measurement of the user and a skin reflectance value of the user. The distance that the depth sensor 104 detects may be within a certain range. While some ranging sensors 102 may be able to detect user presence from a long distance away from the device 100, employing such long-distance ranging sensors for the purpose of facial authentication may not be beneficial, and may consume unnecessary power of the device 100. Accordingly, as previously explained, the depth sensor 104 may be configured to detect distance measurement of the user within a range between a first presence detection threshold and a second presence detection threshold. Further, the skin reflectance value may also be detected using the depth sensor 104. The skin reflectance value is a value that differs based on surface characteristics of objects. Objects such as human, mannequin, plastics, or metals all have different surface characteristics, which cause the reflectance value to differ. In one embodiment, surface reflectance or skin reflectance (if the reflected object is a human) may be measurements of albedo, the ratio of reflected light over incident light. In other embodiments, the surface reflectance or skin reflectance may be measured based on other parameters or methods. For example, amplitudes of the reflected signal, wavelength of the reflected signal, ratio of light reflectance and absorption, etc., may be used. The skin reflectance, which indicates the surface reflectance of a human, may be within a certain range almost common to most or all human beings. The skin reflectance value may be between a first reflectance threshold and a second reflectance threshold. The first reflectance threshold is a minimum value of skin reflectance that can be measured from a human skin (e.g., lips, nose, eyes, arms, legs, etc.) and the second reflectance threshold is a maximum value of skin reflectance that can be measured from a human skin. That is, if a light is reflected on a human skin, the detected reflectance value will be between the first reflectance threshold and the second reflectance threshold. A surface reflectance value that is not within this range may indicate that the object is not of human skin, but rather, for example, a mannequin.

When the depth sensor 104 generates the plurality of measurements (e.g., a plurality of distance measurements, a plurality of skin reflectance value, etc.), a processor of the device 100 outputs a user presence signal in response to the plurality of measurements. This user presence signal is indicative of a user present in the field of view of the depth sensor 104. For example, the user presence signal may be output when the user is present in the scene as captured by the field of view of the depth sensor 104. However, the user presence signal may not be output when the user is not present in the scene as captured by the field of view of the depth sensor 104. The user presence signal may not be output even when the user is present within the field of view of the sensor 102 but is not within a range between the first presence detection threshold and the second presence detection.

In one embodiment, the processor may activate a facial recognition process in response to the user presence signal output by the processor. For example, if the processor determines that the skin reflectance value is of a human being, and the user is within a range between the first presence detection threshold and the second presence detection, minimum required data for initiating the facial recognition process has been met, and the processor will activate the process. Other embodiments of activating the facial recognition process will be explained in connection with FIGS. 3 to 5.

The depth sensor 104 may include, or may operate in conjunction with, an RGB camera. The RGB camera is a camera equipped with a standard complementary metal-oxide semiconductor (CMOS) sensor through which the colored images of persons and objects are acquired. The human eye is sensitive to red, green, and blue (RGB) bands of light, and the general cameras mounted on mobile electronic devices are RGB cameras that capture the same RGB bands, so the images they produce recreate almost exactly what the human eyes see. The RGB camera is also capable of realizing facial recognition by determining the region of interest (ROI) of a human face, detecting the facial characteristics of the face, etc. However, relying on facial authentication using RGB camera may consume significant amounts of power and processing capacity of the electronic device 100.

The depth sensor 104 may include, or may operate in conjunction with, an ambient light sensor. An ambient light sensor is a photodetector that is used to sense the amount of ambient light present in the surroundings or scene. For example, the ambient light sensor can be made using phototransistors, photodiodes, or other photonic integrated circuits. In one embodiment, the ambient light sensor senses the lighting changes in the scene or a view captured within the field of view/angle of view of the sensor. That is, the scene may refer to a scene captured within an angle of view of a depth sensor 104 of the electronic device 100, and may change according to a direction of the depth sensor 104, camera parameters of the depth sensor 104 (e.g., focal length, aperture, and the like), and/or movement of the electronic device 100. The scene may include objects (living and non-living), landscapes, and the like.

The ambient light sensor may sense that the ambient light in the scene has changed when an object is near or in front of the device 100. Due to the presence of the object, the object may affect the ambient light in the scene proximal to the device 100. For example, in broad daylight, a shadow of a person may change the ambient light of the scene because of the shadow cast on the device 100. Further, a waving gesture of a person in daylight may cause the change of the ambient light in the scene because of the shadow of the hand being cast on the device 100. The ambient light sensor is capable of detecting a magnitude of the ambient light in the scene, usually measured as the lux value of the light. The ambient light sensor senses that the ambient light has changed when the difference of the magnitude of ambient light exceeds a minimum threshold value. That is, when the ambient light sensor detects that the amount of ambient light changed exceeds the minimum threshold value, the ambient light sensor may send a user presence signal (e.g., a signal based on measurement inputs of ambient light in the scene) to a processor of the device 100 coupled to the ambient light sensor, and the processor may conclude that the ambient light has changed in the scene based on the user presence signal. On the other hand, when the ambient light sensor detects that the amount of ambient light changed falls short of the minimum threshold value, the processor will conclude that the ambient light has not changed in the scene based on the user presence signal. However, in some cases where the settings have little or no light, for example at night after sunset or in a dark room with no light, the presence of an object or a person may not be able to be sensed based on the ambient light sensor. In these cases, a beam generator may be in use to illuminate light to the scene. In other cases, a depth sensor 104 in the first mode may be used to detect presence of an object or a person at a dark setting. These will be explained in more detail below.

In some embodiments, as previously mentioned, in a dark setting, the ambient light sensor may not be able to sense that an object is present in a scene. In these settings, the beam generator may be utilized to facilitate the presence detection using the ambient light sensor. The beam generator is a light source mounted on the electronic device 100. For example, the beam generator may be a light source made with a light emitting diode (LED), that might be also used as a light flash for taking a picture. This light source can be positioned near the camera of a device or near the ambient light sensor, to help illuminate the scene when there is not enough light. For example, in a dark setting where the ambient light sensor cannot detect the change of ambience in a scene despite the presence of an object (e.g., an attempted user of the electronic device 100 who may or may not be authorized to use the device 100), the beam generator flashes the light toward the scene and the object to form a setting that is similar to a bright daylight setting. By briefly flashing the light on the scene, the ambient light sensor may be able to perform the ambient light detection through the assistance of the beam generator. The duration of the LED flash using the beam generator may be brief or may be lengthened, based on the processing time for determining that the ambient light has changed or not.

In other embodiments, the ambient light sensor may not use the beam generator, and may use the depth sensor 104. The depth sensor 104 is capable of detecting face recognizable distance from a scene whether there is light or no light in the scene. In this case, the processor of the device 100 may determine that, instead of using the beam generator, it may use the depth sensor 104 to detect the presence of an object in the scene. A power management circuit which controls the overall operation of the sensors to reduce power usage in the device 100 may deactivate the ambient light sensor and the beam generator once the processor determines that the depth sensor 104 will have to be used to sense the presence of an object in a scene (e.g., in a dark setting where the ambient light sensor is ineffective).

The depth sensor 104 may utilize image sensor such as infrared (IR) cameras, sensors using structured light, stereoscopic cameras or the like mounted on the electronic device to locate, recognize, and authenticate a user's face for granting access to use the electronic device 100. The depth sensor 104 may be a proximity sensor.

The electronic device 100 can include a personal electronic device such as such as a laptop computer, a mobile phone, a tablet, a monitor of a of a desktop computer, or a monitor and a desktop computer. Users typically utilize these electronic devices by facing the display 102 of the electronic device. The electronic device 100 can include other types of electronic devices than those described above without departing from the scope of the present disclosure.

Figure 2A:
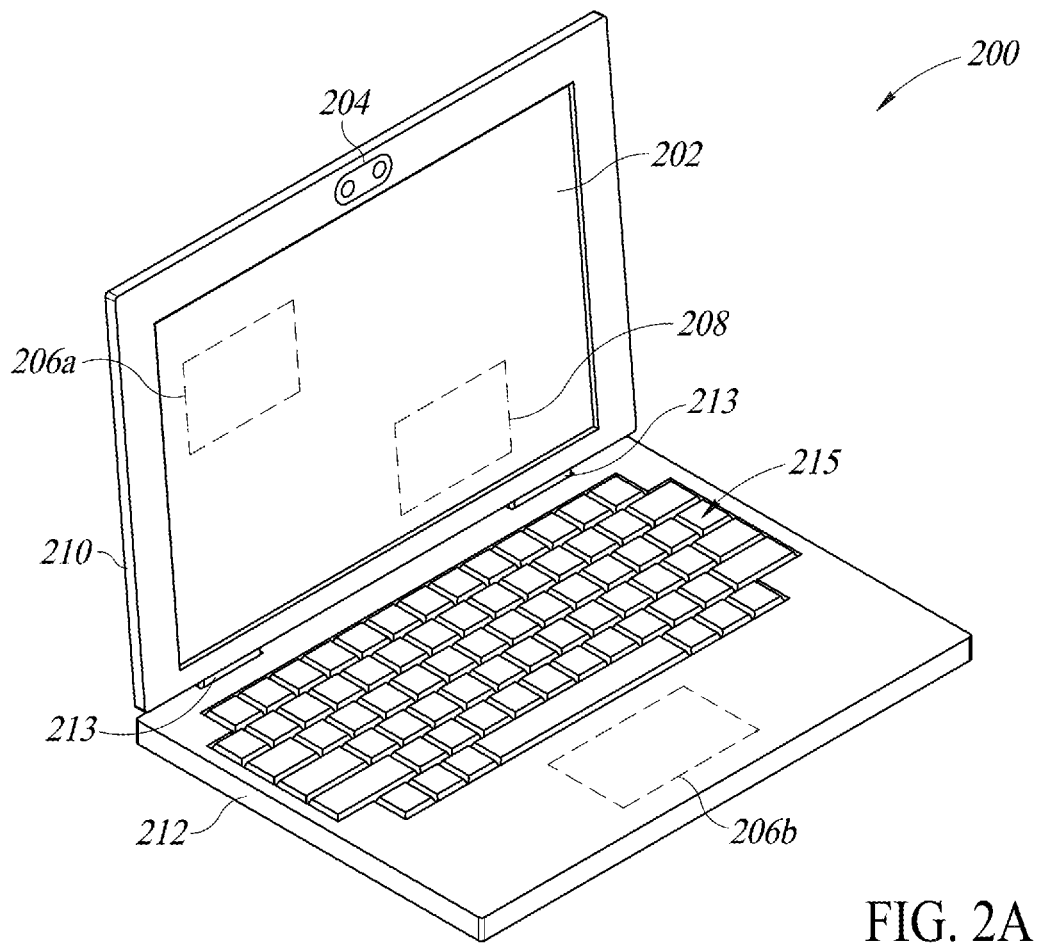
FIG. 2A is a perspective view an electronic device, according to one embodiment.

FIG. 2A is a perspective view of a laptop computer 200, according to one embodiment. The laptop computer 200 is one example of the electronic device 100 of FIG. 1. Accordingly, the laptop computer 200 can include components and functionality described in relation to FIG. 1.

The laptop computer 200 includes a top lid 210 and a bottom lid 212. The top lid 210 and the bottom lid 212 are coupled together by one or more hinges 213. The one or more hinges 213 enable the top lid 210 to rotate relative to the bottom lid 212. The laptop computer 200 can be closed by rotating the top lid 210 until the top lid 210 is in contact with the bottom lid 212. The terms "top lid" and "bottom lid" can correspond to the first and second members or first and second portions of a laptop computer connected together by a hinge or other device that allows rotation relative to each other. Accordingly, the top lid 210 may be a first lap top computer member that includes a display. The bottom lid 212 may be a second lap top computer member that includes a keyboard.

The top lid 210 includes a display, a depth sensor 204, a first inertial measurement unit 206a, and a sensor processing unit 208. The first inertial measurement unit 206a and the sensor processing unit 208 are represented in dashed lines indicating that the first inertial measurement unit 206a and the sensor processing unit 208 are within the top lid 210 and are not visible from the exterior of the laptop computer 200. The depth sensor 204 may be positioned above the display in the top lid 210. The first inertial measurement 206a and the sensor processing unit 208 unit may be positioned at any suitable location within the top lid 210.

The bottom lid 212 includes a second inertial measurement unit 206b and the keyboard 215. The second inertial measurement unit 206b is represented in dashed lines indicating that the second inertial measurement unit 206b is positioned within the bottom lid 212 and is not visible from the exterior of laptop computer 200.

During operation of the laptop computer 200, a user typically opens the laptop computer 200 by rotating the top lid 210 away from the bottom lid 212. In typical situations, the top lid 210 is rotated to about 1000°. The user typically is positioned in front of and facing the display 202. In this position, the user can conveniently view the display 202 and can utilize the keyboard 215 to provide inputs into the laptop computer 200. From this position, the depth sensor 204, the first inertial measurement unit 206a, and the second inertial measurement unit 206b, and the sensor processing unit 208 can cooperate to detect the presence of the user. In particular, these components can detect and recognize the face of the user.

Figure 2B:
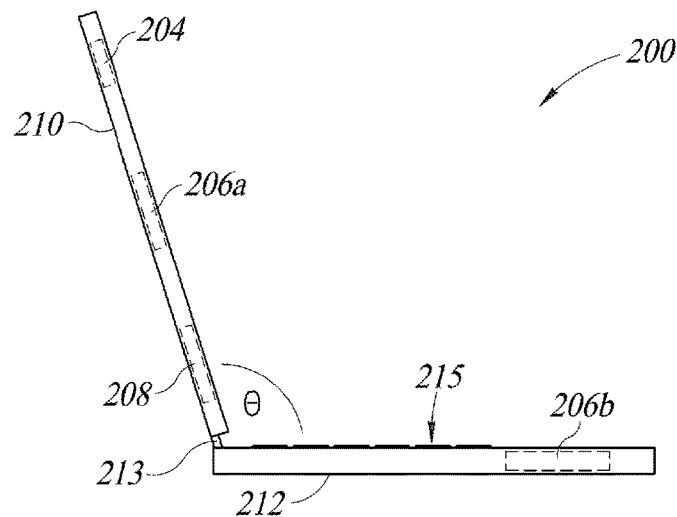
FIG. 2B is a side view of the electronic device of FIG. 2A, according to one embodiment.

FIG. 2B is a side view of the laptop computer 200 of FIG. 2A. In the side view, the laptop is open to a rotational angle θ. θ is an angle of the top lid 210 relative to the bottom lid 212. The first and second inertial measurement units 206a, 206b cooperate to detect the rotational angle θ. Because the first inertial measurement unit 206a is in the top lid 210 and the second inertial measurement unit 206b is in the bottom lid 212, the inertial measurement units 206a, 206b can detect rotational angle θ.

In one embodiment, the first and second inertial measurement units 206a, 206b include multi-axis accelerometers. The multi-axis accelerometers can detect acceleration in three mutually orthogonal axes. When the laptop computer 200 is stationary, the multi-axis accelerometers output signals indicative of the orientation of the inertial measurement units 206a, 206b relative to the Earth's gravitational pull. In the absence of other accelerations, the gravitational pull of the earth will deflect the multi-axis accelerometers of the first and second inertial measurement units in a known manner. The inertial sensor signals output by the multi-axis accelerometers of the first inertial measurement unit 206a indicate the orientation of the top lid relative to the Earth's gravitational pull. The inertial sensor signals output by the multi-axis accelerometers of the second inertial measurement unit 206b are indicative of the orientation of the bottom lid relative to the Earth's gravitational pull. The difference in the orientations of the top lid 210 and the bottom lid 212 correspond to the rotational angle of the top lid 210 relative to the bottom lid 212. Accordingly, the sensor processing unit 208 can determine the rotational angle θ based on the inertial sensor signals from the first and second inertial measurement units 206a, 206b.

The depth sensor 204 senses the depth of objects in the field of view of the depth sensor 204 in front of the display 202. As described previously, the depth sensor 204 captures images and determines the depth of objects in the images. The depth sensor 204 provides depth sensor signals to the sensor processing unit 208. In one embodiment, the depth sensor 204 is a time of flight sensor. Further details regarding time of flight sensors and user detection can be found in U.S. Patent Application Publication No. 2019/0213309, titled "FACIAL AUTHENTICATION SYSTEMS AND METHODS UTILIZING TIME OF FLIGHT SENSING", filed on Jan. 4, 2019. U.S. Patent Application Publication No. 2019/0213309 is hereby incorporated by reference in its entirety.

The sensor processing unit 208 receives the inertial sensor signals from the inertial measurement units 206a, 206b, and the depth sensor signals from the depth sensor 204. The sensor processing unit 208 determines the rotational angle θ based on the inertial sensor signals from the person second inertial measurement units 206a, 206b. The sensor processing unit 208 utilizes the rotational angle θ to assist in detecting the face of the user.

Traditional electronic devices may be able to detect the face of the user when the rotational angle θ is between 90° and 110°. However, if the rotational angle θ is outside of this range, then traditional electronic devices are unable to detect the face of the user. This is because traditional electronic devices only expect the face of the user to be more or less centered in the field of view of the depth sensor.

The laptop computer 200 is able to detect the face of the user in a much larger range of rotational angles θ than are traditional laptop computers. This is because the sensor processing unit 208 utilizes the detection rotational angle from the inertial sensor signals to determine where the face of the user should be expected in the field of view of the depth sensor 204. For example, as the rotational angle θ increases beyond 110°, the sensor processing unit 208 expects the face of the user to be lower in the field of view of the depth sensor 204. As the rotational angle θ decreases below 90°, the sensor processing unit 208 expects the face of the user to be higher in the field of view of the depth sensor 204. Accordingly, based on the inertial sensor signals, the sensor processing unit 208 is able to detect the face of the user for rotational angles between 1450 and 75°. The sensor processing unit 208 can detect the face of the user for other ranges of rotational angles θ than those described above without departing from the scope of the present disclosure.

Figure 2C:
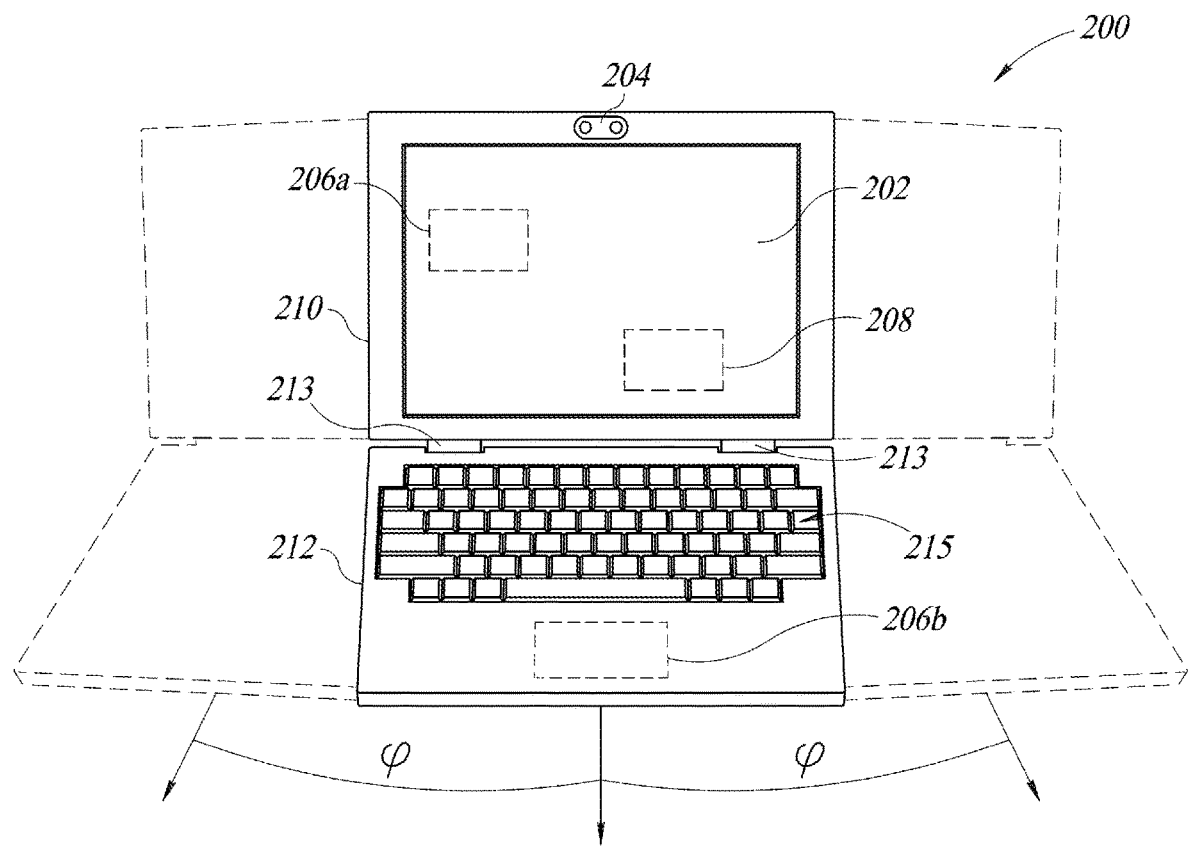
FIG. 2C is a front view of the electronic device of FIG. 2A, according to one embodiment.

FIG. 2C is a front view of the laptop computer 200 of FIG. 2A, according to one embodiment. The front view of FIG. 2C is utilized to illustrate the heading angle φ of the laptop computer 200. The heading angle φ corresponds to the angle of lateral rotation of the laptop computer 200 relative to the user. In most cases, the heading angle φ will be approximately 0°. This is because typically, the user will use the laptop while positioned directly in front of the depth sensor 204. However, in some cases the user may initially be positioned such that the heading angle φ is 0°, but then may rotate the laptop computer laterally to the left or the right. The heading angle φ becomes nonzero based on these lateral rotations.

Traditional laptop computers can only detect the face of the user when the heading angle φ is between −5° and 5°, where lateral rotations to the left correspond to angles less than zero and lateral rotations to the right correspond to angles greater than zero. This is because traditional laptop computers expect that the face of the user will always be in the lateral center of the field of view of the laptop computer. If the user rotates the laptop computer laterally, the traditional laptop computers will no longer be able to detect and recognize the face of the user.

The laptop computer 200 is able to detect the face of the user for much larger heading angles φ that are traditional laptop computers. The sensor processing unit 208 utilizes inertial sensor signals from one or both of the first and second inertial measurement units 206a, 206b to determine the heading angle φ. The sensor processing unit 208 is able to determine where to expect the face of the user in the lateral aspect of the field of view of the depth sensor 204.

In one embodiment, the first and second inertial measurement units 206a, 206b include multi-axis gyroscopes. The multi-axis gyroscopes can include three axis gyroscopes able to detect rotational motion around each of three mutually orthogonal rotational axes. The multi-axis gyroscopes output inertial sensor signals indicative of rotational motion of the laptop computer 200. The sensor processing unit 208 utilizes the inertial sensor signals to determine the heading angle φ of the laptop computer 200 relative to the user.

In one embodiment, when the user initially opens or otherwise activates the laptop computer 200, the user typically will be directly in front of the laptop computer 200. In this case, the heading angle φ is 0°. The laptop computer 200 may initially detect the face of the user in the lateral center of the field of view of the depth sensor 204. Subsequently, the user may laterally rotate the laptop computer 200. While the user laterally rotates the laptop computer 200, the multi-axis gyroscopes of the inertial measurement units 206a, 206b output inertial sensor signals indicative of the lateral rotation of the laptop computer 200. The sensor processing unit 208 receives the inertial sensor signals, calculates the change in the heading angle φ, and determines that the face of the user is expected to shift laterally in the field of view of the depth sensor 204. Based on this expectation, the sensor processing unit 208 is able to maintain detection of or track the face of the user during and after the lateral rotation of the laptop computer 200.

As will be described in more detail below, the sensor processing unit 208 can utilize machine learning processes to assist in detecting the face of the user based on inertial sensor signals and depth sensor signals.

In one embodiment, the laptop computer 200 utilizes one or both of the inertial measurement units 206a, 206b to provide greater power efficiency for the laptop computer 200. For example, the laptop computer 200 can maintain the depth sensor 204 in a low-power or powered off mode until the inertial measurement units 206a, 206b indicate that the depth sensor 204 should be turned on.

In a low-power mode, the inertial measurement units 206a, 206b can indicate whether the laptop computer 200 is vibrating. The vibration pattern can be indicative of the laptop computer 200 being on a user's lap rather than on a table or other flat surface. The inertial sensor signals can cause the sensor processing unit, or another control system, to wake up the depth sensor 204 to begin detecting the presence of the user. In another example, the time-of-flight sensor 204 can turn off after detecting the presence of the user. When the internal measurement units 206a, 206b detect rotation of the top lid 210 relative to the bottom lid 212, the depth sensor 204 can wake up to detect the user in a new position in the field of view of the depth sensor 204. Additionally, if the inertial measurement units 206a, 206b detect lateral rotational motion of the laptop computer beyond the threshold intensity, the depth sensor 204 can wake up to detect the user in a new position in the field of view of the depth sensor 204. In high-power modes, the depth sensor 204 can remain on and user presence detection can be initiated based on the proximity of objects relative to the depth sensor 204.

FIGS. 2A-2C illustrate an example of a laptop computer 200. However, principles described in relation to FIGS. 2A-2C can extend to other types of electronic devices without departing from the scope of the present disclosure.

Figure 3A:
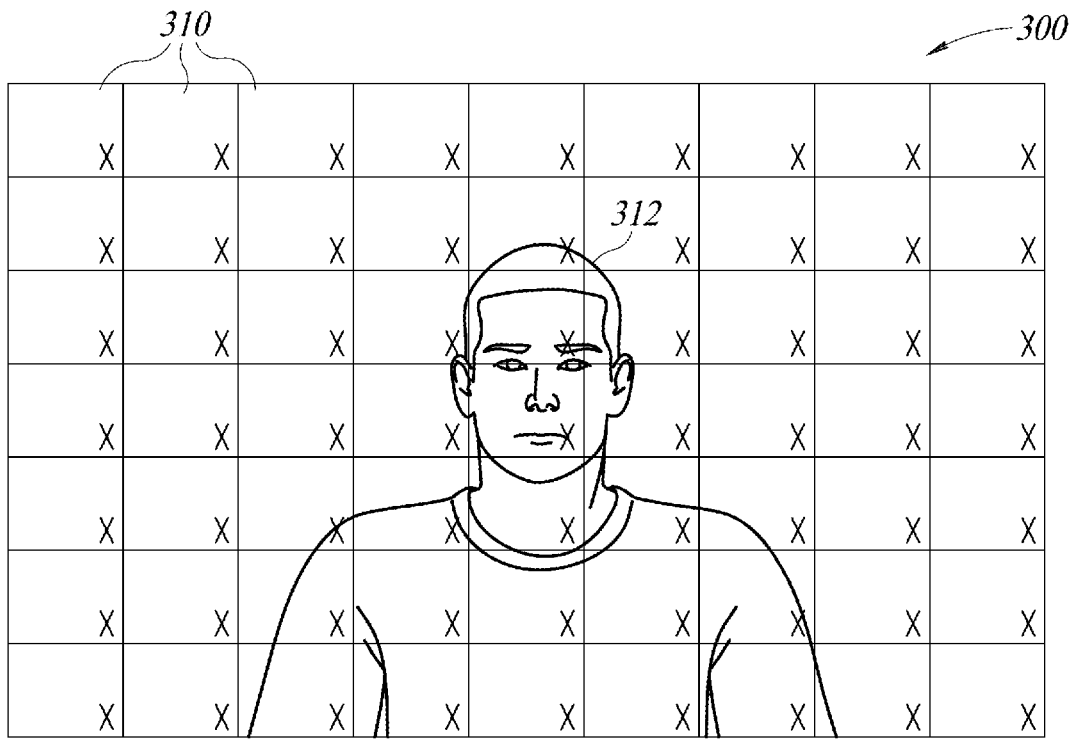
FIGS. 3A-C are representations of depth images captured by a depth sensor of an electronic device.

FIG. 3A illustrates a depth image 300 captured by the depth sensor 204 of FIGS. 2A-2C, according to one embodiment. The depth image or depth map 300 represents the field of view of the depth sensor 204. The depth image 300 is a grid including a plurality of areas 310 or zones. Each area or zone 310 corresponds to an area or zone of an array of single photon avalanche diodes (SPAD) a depths sensors, such as a time of flight sensor. Each zone of the array includes a plurality of SPAD diodes that collectively provide a depth measurement for that zone. The depth image assigns a depth to each area 310 of the depth image 300. In practice, the depth image 300 may include a much higher resolution, i.e. a much larger number of smaller areas 310, then is shown in FIG. 3A.

The depth image 300 includes a depth value for each area or zone 310 of the depth image 300. The depth values are denoted by the letter X. In other words, the depth value X indicates how far away from the depth sensor 204 is the object in the area 310. Most commonly, depth values X for the areas 310 including the face of the user 312 are between 30 cm and 90 cm. The depth values X for the areas 310 that do not include the face of the user 312 will typically be much larger than the depth values X for the areas 310 that include the face of the user 312. For example, in many cases the other areas 310 correspond to a wall of the room in which the user 312 is using the laptop computer 200. In these cases, the depth values X may commonly be between 3 m and 15 m, though other values are possible depending on the arrangement of the venue in which the user 312 uses the laptop computer 200.

In the example of FIG. 3A, the face of the user 312 is positioned nearly in the center of the field of view of the depth sensor 204. This corresponds to a most common position for the face of the user 312. This is because most often the rotational angle θ, the heading angle φ, and the voluntary positioning of the user 312 result in the face of the user being nearly in the center of the field of view of the depth sensor 204 as many people find this to be the most convenient orientation from which to utilize the laptop computer 200. The sensor processing unit 208 utilizes the inertial sensor signals and the depth sensor signals to detect the face of the user 312 in the field of view of the depth sensor 204.

Figure 3B:
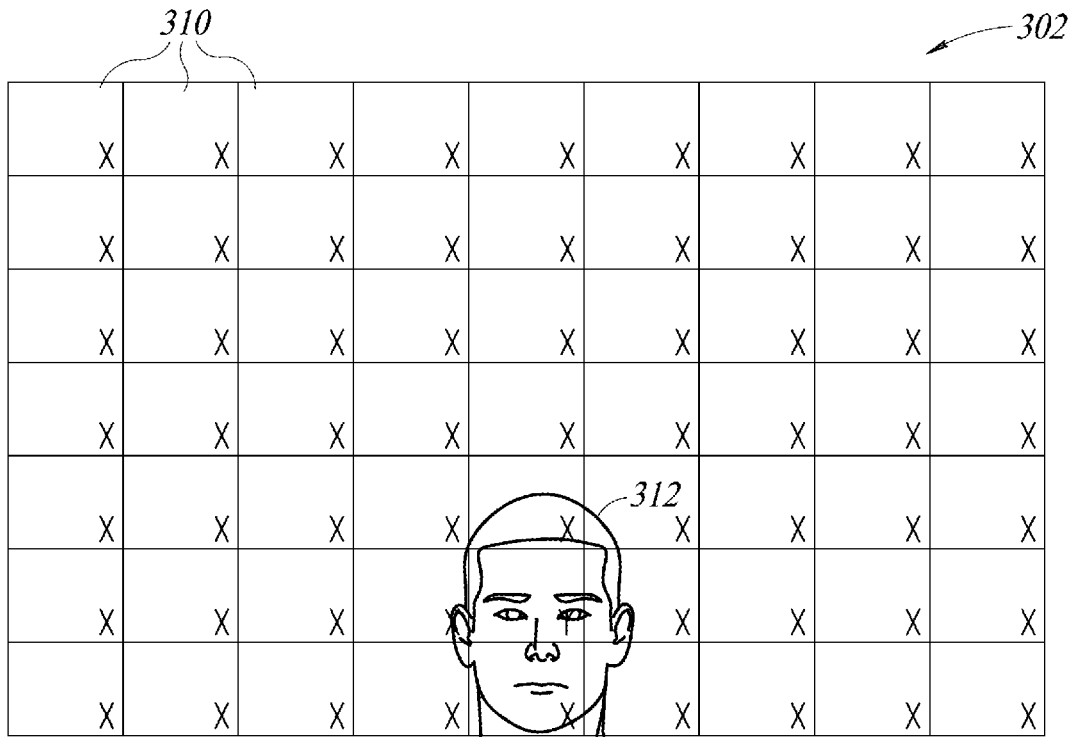

FIG. 3B illustrates a depth image 302 captured by the depth sensor 204 of FIGS. 2A-2C, according to one embodiment. The depth image 302 represents the field of view of the depth sensor 204. In the example of FIG. 3B, the rotational angle θ of the top lid 210 relative to the bottom lead 212 is greater than normal. The result is that the face of the user 312 appears in the vertical bottom of the filler view of the depth sensor 204. Thus, the face of the user 312 appears at the bottom of the depth image 302 of FIG. 3B.

As described previously, the sensor processing unit 208 is able to detect the face of the user at this unusual location based on the combination of the inertial sensor signals from the first and second inertial measurement units 206a, 206b and the depth sensor signals from the depth sensor 204. In particular, the sensor processing unit 208 calculates the rotational angle based on the inertial sensor signals from the accelerometers of the first and second inertial measurement units 206a, 206b. Based on the calculated rotational angle, the sensor processing unit 208 expects the face of the user 312 to be near a bottom of the field of view of the depth sensor 204. Accordingly, the sensor processing unit 208 readily identifies the face of the user 312 near the bottom of the depth image 302.

Figure 3C:
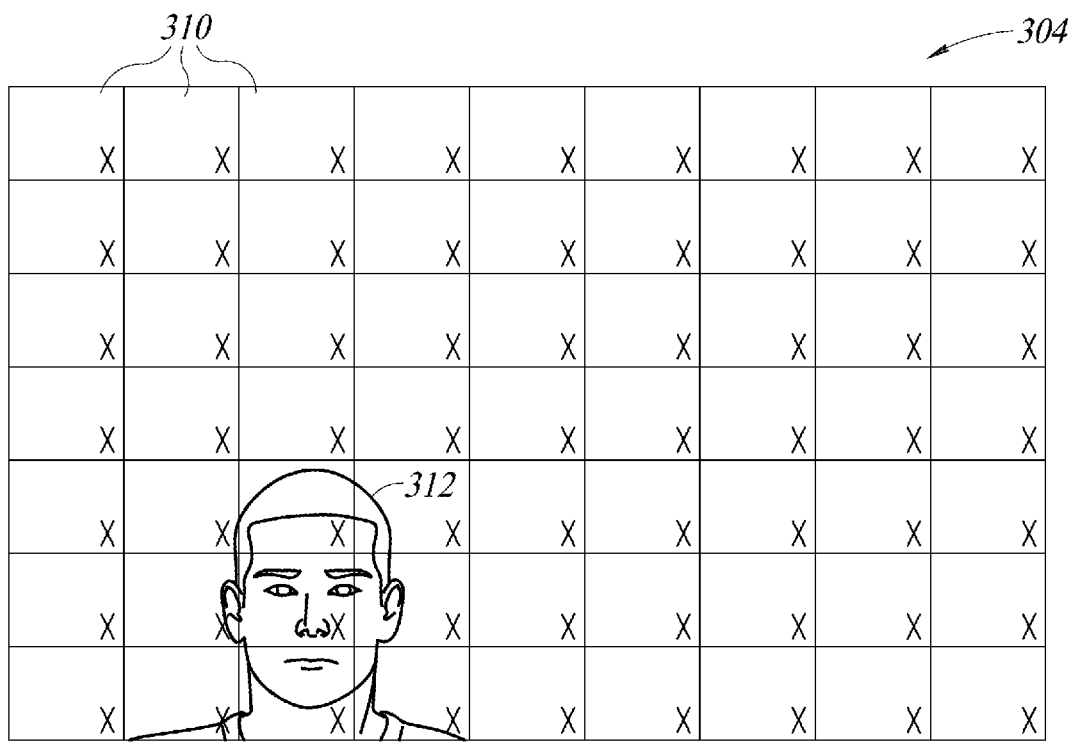

FIG. 3C illustrates a depth image 304 captured by the depth sensor 204 of FIGS. 2A-2C, according to one embodiment. The depth image 304 represents the field of view of the depth sensor 204. In the example of FIG. 3C the rotational angle θ and the heading angle φ are greater than normal. The result is that the face of the user 312 appears in the lower than normal and further to the left in the field of view of the depth sensor 204. Thus, the face of the user 312 appears at the lower left of the depth image 304 of FIG. 3C.

As described previously, the sensor processing unit 208 is able to detect the face of the user at this unusual location based on the combination of the inertial sensor signals from the first and second inertial measurement units 206a, 206b and the depth sensor signals from the depth sensor 204. In particular, the sensor processing unit 208 calculates the heading angle φ based on inertial sensor signals from gyroscopes of one or both of the first and second inertial measurement units 206a, 206b. The sensor processing unit 208 also calculates the rotational angle θ as described previously. Based on the calculated heading angle φ rotational angle θ, the sensor processing unit 208 expects the face of the user 312 to be in a lower left of the field of view of the depth sensor 204. Accordingly, the sensor processing unit 208 readily identifies the face of the user 312 in the lower left of the depth image 304.

In one embodiment, the sensor processing unit 208 tracks the face of the user as the heading angle φ changes. For example, the processing unit 208 may initially detect the face of the user near a lateral center of the field of view of the depth sensor 204. As the user latterly rotates laptop computer 200, the gyroscopic inertial sensor signals received by the sensor processing unit 208. The sensor processing unit calculates the rotational motion of the laptop computer 200 and tracks the face of the user during and after the rotation.

Figure 4:
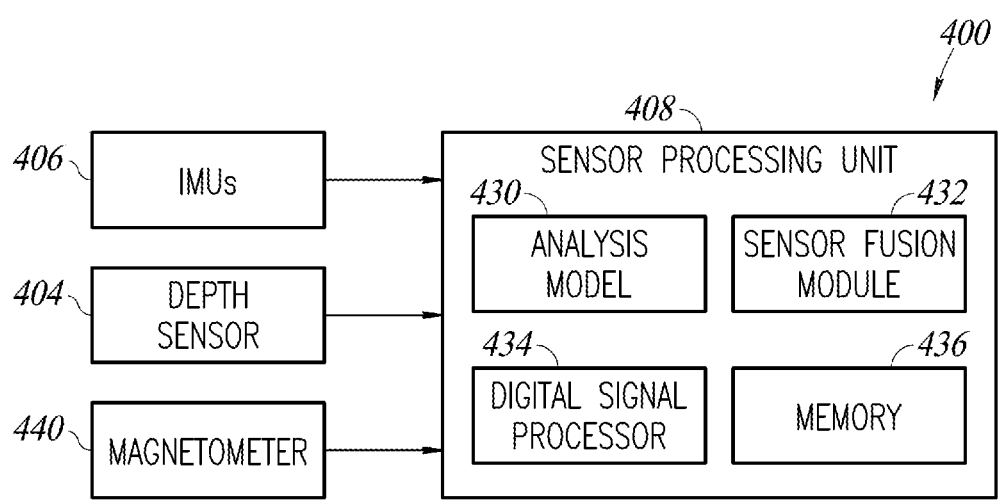
FIG. 4 is a block diagram of internal circuitry of an electronic device, according to one embodiment.

FIG. 4 is a block diagram of circuitry of an electronic device 400, according to one embodiment. The electronic device 400 may correspond to the laptop computer 200 of FIG. 2. The electronic device 400 includes inertial measurement units 406. The inertial measurement units 406 can include multi-axis accelerometers and gyroscopes. The inertial measurement units 406 may be located at different locations within electronic device 400. The electronic device 400 includes a depth sensor 404. The depth sensor 404 can correspond to the depth sensors 102 and 202 of FIGS. 1 and 2A-2C. The electronic device 400 includes a magnetometer 440.

The electronic device 400 includes a sensor processing unit 408. The sensor processing unit 408 can include components and functionality as described in relation to the sensor processing units 108 and 208. Furthermore, the sensor processing unit 408 includes an analysis model 430, a sensor fusion module 432, and a digital signal processor 434, in the memory 436.

The digital signal processor 434 receives inertial sensor signals from the inertial measurement units 406. The digital signal processor 434 also receives the sensor signals from the depth sensor 404. The digital signal processor 434 they also receive magnetic sensor signals from the magneto meter 440. The digital signal processor 434 processes the inertial sensor signals in the depth sensor signals. The digital signal processor 434 conditions the sensor signals to be analyzed by one or both of the analysis model 430 and the sensor fusion module 432. The digital signal processor 434 may include an analog-to-digital converter that receives analog inertial sensor signals and depth sensor signals from the inertial measurement units 406 and the depth sensor 404. The analog-to-digital converter converts the analog signals to digital signals. The digital signal processor may then process the digitized sensor signals. The digital signal processor outputs the digitized sensor signals to one or both of the analysis model 430 and a sensor fusion module 432. The digital signal processor 434 may generate depth images from the depth sensor signals, such as the depth images 302-304 of FIGS. 3A-3C. The digital signal processor 434 may also calculate the rotational angle θ in the heading angle φ.

The sensor fusion module 432 analyzes the inertial sensor signals and the depth sensor signals in order to track the face of the user. The sensor fusion module 432 may combine and transform inertial sensor signals and depth sensor signals into new data structures that can then be analyzed to detect and recognize the face of the user. As described previously, the sensor fusion module 432 can detect the rotational angle θ, the heading angle φ, and the rate of change in the heading angle φ based on the inertial sensor signals. The sensor fusion module 432 can then utilize the rotational angle θ and the heading angle φ to detect and track the face of the user.

In one embodiment, the analysis model 430 includes a neural network trained with a machine learning process to detect the face of the user based on inertial sensor signals and death sensor signals. In practice, the analysis model 430 may be part of the sensor fusion module 432. The neural network can receive the most recent inertial sensor signals and depth sensor signals and can process them to determine the location of the face of the user in one or more depth images.

In one embodiment, the machine learning process includes passing training set data to the analysis model 430. The training set data includes historical inertial sensor data, historical depth sensor data, and historical user location data to the neural network of the analysis model 430. The historical user location data can be utilized as labels for the training process. Each historical user location data identifies the location of the user, or the phase of the user, in a depth image. The training set data includes the historical inertial sensor signals and historical depth sensor signals associated with each depth image.

During the training process, sets of historical inertial sensor data and historical depth sensor data are passed to the analysis model 430. The analysis model 430 generates, for each set of historical inertial sensor data and historical depth sensor data, a predicted user location within the depth image. The predicted user location is then compared to the actual historical user location associated with that data set. The analysis model generates an error function indicating the difference between the predicted user location and the actual historical user location. The analysis model 430 then adjusts internal parameters of the neural network. The analysis model 430 again analyzes one or more sets of historical inertial sensor data and historical depth sensor data, generates predicted location data, and compares the predicted location data to the historical location data. The analysis model 430 again adjusts internal functions of the neural network. This process continues in iterations until the analysis model 430 can generate predicted location data that matches the historical location data. At this point, the training process is complete and the analysis model 430 can be utilized to detect location of the user, or the face of the user, based on inertial sensor signals and depth sensor signals.

In one embodiment, the training process utilizes training set data generated from the electronic device 400. In other words, the training set data includes historical inertial sensor data, historical depth sensor data, and historical user location data previously generated by the electronic device 400. This process can calibrate the neural network of the analysis model 430 to detect contract location of the user based on previously observed usage characteristics of the electronic device 400.

In one embodiment, the training process utilizes training set data from other electronic devices. In this case, the training process can utilize large sets of historical inertial sensor data, historical user location data, and historical location data from a large number of electronic devices previously used by other users. The training process can train the analysis model 430 to enable the analysis model to accurately detect contract the location of the user based on inertial sensor signals and depth sensor signals.

In one embodiment, the electronic device 400 can include multiple neural networks. A first neural network may be associated with both the inertial measurement units 406 and the depth sensor 404. The second neural network can be associated with the analysis model 430 and can perform the functions described above. The first neural network may be a simple neural network that receives inertial sensor data depth sensor data and outputs the combined data set of the inertial sensor data and the depth sensor data.

The memory 436 can include one or more computer readable media. The memory 436 can store instructions and data related to the function of the sensor processing unit.

Figure 5:
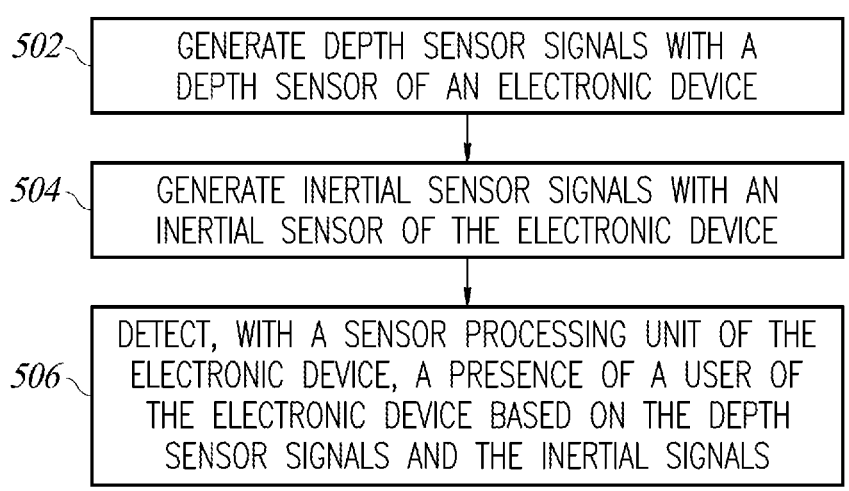
FIG. 5 is a flow diagram of a method for detecting the presence of a user of an electronic device, according to one embodiment.

FIG. 5 is a flow diagram of a method 500 for detecting the presence of a user of electronic device, according to one embodiment. At 502, the method 500 includes generating depth sensor signals with a depth sensor of an electronic device. At 504, the method 500 includes generating inertial sensor signals within inertial sensor of an electronic device. At 506, the method 500 includes detecting, with a sensor processing unit of the electronic device, a presence of the user of the electronic device based on the depth sensor signals and the inertial sensor signals.

Figure 6:
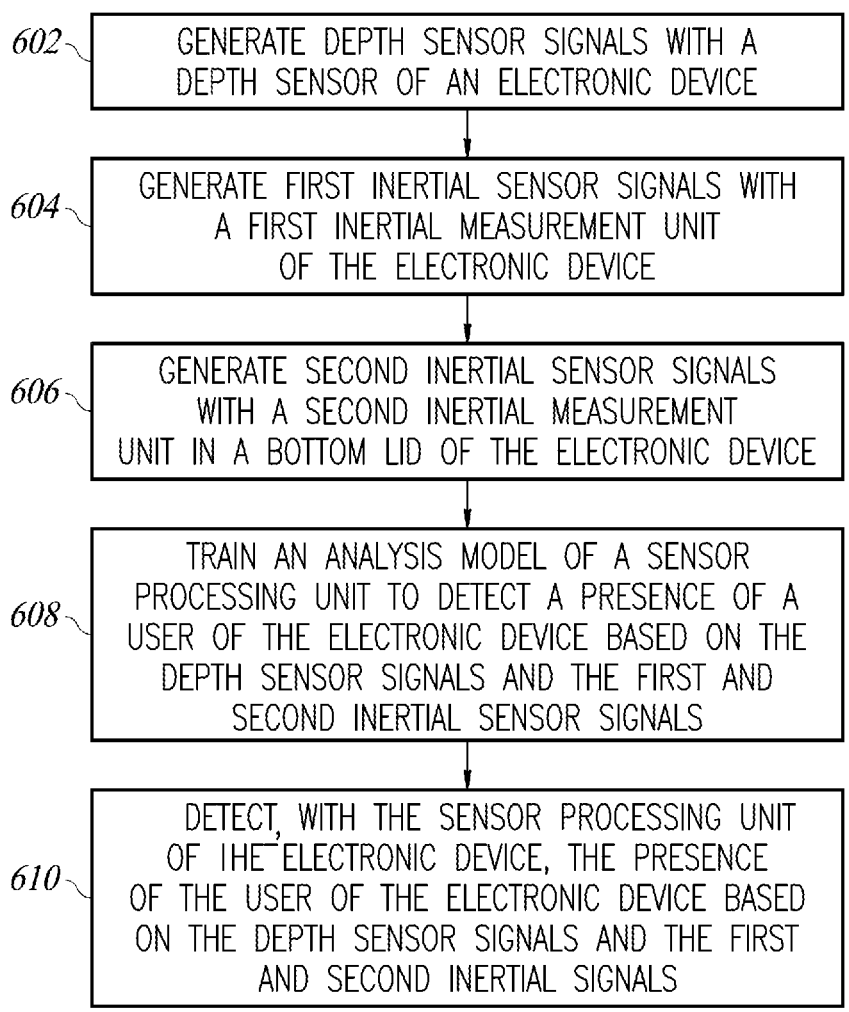
FIG. 6 is a flow diagram of a method for detecting the presence of a user of an electronic device, according to one embodiment.

FIG. 6 is a flow diagram of a method 600 for detecting the presence of the user of an electronic device, according to one embodiment. At 602, the method includes generating depth sensor signals with a depth sensor of an electronic device. At 604, the method includes generating first inertial sensor signals with a first inertial measurement unit in a top lid of the electronic device. At 606, the method includes generating second inertial sensor signals with a second inertial measurement unit and a bottom lid of the electronic device. At 608, the method includes training an analysis model of a sensor processing unit two detect a presence of the user of the electronic device based on the depth sensor signals and the first and second inertial sensor signals. At 610, the method 600 includes detecting, with the sensor processing unit of the electronic device, the presence of the user of the electronic device based on the depth sensor signals and the first and second inertial signals.

In one embodiment, an electronic device includes a display, a depth sensor configured to sense a distance between the depth sensor display and objects in view of the depth sensor, and a first inertial measurement unit configured to detect an orientation of the electronic device. The electronic device includes a sensor processing unit configured to receive depth sensor signals from the depth sensor, to receive inertial sensor signals from the first inertial measurement unit, and to detect a presence of a user based on the depth sensor signals and the inertial sensor signals.

In one embodiment, a method includes generating depth sensor signals with a depth sensor of an electronic device, generating first inertial sensor signals with a first inertial sensor of the electronic device, and detecting, with a sensor processing unit of the electronic device, a presence of a user of the electronic device based on the depth sensor signals and the first inertial signals.

In one embodiment, a computing device includes an upper lid having a display, a lower lid including a keyboard, and a time of flight sensor positioned in the upper lid. The computing device includes a first inertial measurement unit positioned in the upper lid, a second inertial measurement unit positioned in the lower lid, and a sensor processing unit configured to receive depth sensor signals from the time of flight sensor and inertial sensor signals from the first and second inertial measurement units and to detect a head of a user based on the depth sensor signals and the inertial sensor signals.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device, comprising:
a display;
a depth sensor configured to sense a distance between the display and objects in view of the depth sensor;
a first inertial measurement unit configured to detect an orientation of the electronic device; and
a sensor processing unit configured to receive depth sensor signals from the depth sensor, to receive inertial sensor signals from the first inertial measurement unit, and to detect a presence of a user based on the depth sensor signals and the inertial sensor signals, wherein the sensor processing unit includes:
a first neural network configured to receive the depth sensor signals and inertial sensor signals and to generate combined output data; and
an analysis model including a second neural network trained with a machine learning process to detect the presence of the user based on the combined output data.

2. The electronic device of claim 1, further comprising:
a top lid including the depth sensor, the display, and the first inertial measurement unit;
a hinge coupled to the top lid; and
a bottom lid rotatably coupled to the top lid by the hinge and including:
a second inertial measurement unit, the sensor processing unit is configured to detect the presence of the user based on inertial sensor signals from the first and second inertial measurement units.

3. The electronic device of claim 2, wherein the depth sensor includes a time of flight sensor.

4. The electronic device of claim 2, wherein the sensor processing unit is configured to detect a rotation angle between the top and bottom lids based on sensor signals from the first inertial measurement unit and to detect the presence of the user based on the rotation angle.

5. The electronic device of claim 4, wherein at least one of the first and second inertial measurement units includes an accelerometer.

6. The electronic device of claim 2, wherein the sensor processing unit is configured to detect a heading angle based on sensor signals from at least one of the first and second inertial measurement units.

7. The electronic device of claim 6, wherein at least one of the first and second inertial measurement units includes a gyroscope.

8. The electronic device of claim 1, wherein the depth sensor includes a light source and a light sensor.

9. A method, comprising:
generating depth sensor signals with a depth sensor of an electronic device;
generating first inertial sensor signals with a first inertial sensor of the electronic device;
detecting, with a sensor processing unit of the electronic device, a presence of a user of the electronic device based on the depth sensor signals and the first inertial sensor signals;
receiving, with a first neural network of the sensor processing unit, the depth sensor signals and inertial sensor signals;
generate combined output data with the first neural network based on the depth sensor signals and the inertial sensor signals; and
training, with a machine learning process, a second neural network of the sensor processing unit to detect the presence of the user based on the combined output data.

10. The method of claim 9, wherein a first inertial measurement unit is positioned in a top lid of an electronic device.

11. The method of claim 10, further comprising:
generating second inertial sensor signals with a second inertial measurement unit in a bottom lid of the electronic device; and
detecting the presence of the user with the sensor processing unit based on the second inertial sensor signals.

12. The method of claim 11, further comprising:
detecting a rotation angle between the top and bottom lids based on first and second inertial sensor signals; and
detecting the presence of the user based on the rotation angle.

13. The method of claim 9, further comprising:
detecting a heading of the electronic device based on the first inertial sensor signals; and
detecting the presence of the user based on the heading angle.

14. The method of claim 9, wherein the electronic device is a laptop computer.

15. A computing device, comprising:
an upper lid having a display;
a lower lid including a keyboard;
a time of flight sensor positioned in the upper lid;
a first inertial measurement unit positioned in the upper lid;
a second inertial measurement unit positioned in the lower lid; and
a sensor processing unit including:
- a first neural network configured to receive depth sensor signals from the time of flight sensor and inertial sensor signals from the first and second inertial measurement units and to generate combined output data; and
- an analysis model including a second neural network configured to detect a head of a user based on the combined output data, wherein the second neural network is trained with a machine learning process to detect the presence of the user based on the combined output data.

16. The computing device of claim 15, wherein the sensor processing unit is configured to detect a rotation angle of the upper lid and a heading angle of the upper and lower lids based on the first and second inertial measurement units and to detect the face of the user based on the rotation angle and the heading angle.

* * * * *